(12) United States Patent
Chenxi et al.

(10) Patent No.: US 11,048,550 B2
(45) Date of Patent: Jun. 29, 2021

(54) METHODS, DEVICES AND COMPUTER PROGRAM PRODUCTS FOR PROCESSING TASK

(71) Applicant: EMC IP Holding Company LLC, Hopkinton, MA (US)

(72) Inventors: Hu Chenxi, Beijing (CN); Kun Wang, Beijing (CN); Sanping Li, Beijing (CN); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 16/443,181

(22) Filed: Jun. 17, 2019

(65) Prior Publication Data
US 2020/0348965 A1 Nov. 5, 2020

(30) Foreign Application Priority Data
Apr. 30, 2019 (CN) .......................... 201910362877.8

(51) Int. Cl.
*G06F 9/48* (2006.01)
(52) U.S. Cl.
CPC .................................. *G06F 9/4843* (2013.01)
(58) Field of Classification Search
CPC ............. G06F 15/17318; G06F 9/4843; G06F 2207/4924; G06F 7/4806; G06F 7/4991; G06F 7/50; G06F 7/57
See application file for complete search history.

(56) References Cited

U.S. PATENT DOCUMENTS

| | | | | |
|---|---|---|---|---|
| 2007/0220164 A1* | 9/2007 | Inagaki | ............. | G06F 15/17381 709/231 |
| 2008/0301683 A1* | 12/2008 | Archer | ................. | G06F 9/4843 718/102 |
| 2011/0258245 A1* | 10/2011 | Blocksome | ....... | G06F 15/17387 709/201 |
| 2013/0151713 A1* | 6/2013 | Faraj | ...................... | H04L 67/14 709/227 |
| 2015/0154058 A1* | 6/2015 | Miwa | .................. | G06F 11/3404 719/313 |

(Continued)

OTHER PUBLICATIONS

Wikipedia, "P4 (Programming Language)," www.en.wikipedia.org/wiki/P4_(programming_language), Apr. 2, 2019, 3 pages.

(Continued)

*Primary Examiner* — Dong U Kim
(74) *Attorney, Agent, or Firm* — Ryan, Mason & Lewis, LLP

(57) ABSTRACT

Embodiments of the present disclosure provide methods, devices, and computer program products for processing a task. A method of processing a task comprises: receiving, at a network device and from a set of computing devices, a set of processing results derived from processing the task by the set of computing devices; in response to receiving the set of processing results, executing a reduction operation on the set of processing results; and transmitting a result of the reduction operation to the set of computing devices. In this way, embodiments of the present disclosure can significantly reduce an amount of data exchanged among a plurality of devices processing a task in parallel, and thus reduce network latency caused by data exchange.

20 Claims, 15 Drawing Sheets

(56) References Cited

U.S. PATENT DOCUMENTS

| 2015/0358219 | A1* | 12/2015 | Kanda | H04L 41/0896 |
| | | | | 709/224 |
| 2018/0217815 | A1* | 8/2018 | Hinds | G06F 17/16 |
| 2019/0073247 | A1* | 3/2019 | Kondo | H03M 13/09 |
| 2020/0257499 | A1* | 8/2020 | Lutz | G06F 7/49942 |

OTHER PUBLICATIONS

Barefoot Networks, "TOFINO: World's Fastest P4-Programmable Ethernet Switch ASICs," barefootnetworks.com/products/brief-tofino, 2019, 6 pages.

P4 Language Consortium, "P4," p4.org/, downloaded Jun. 10, 2019, 1 page.

X. Jin et al., "NetCache: Balancing Key-Value Stores with Fast In-Network Caching," Proceedings of the 26th Symposium on Operating Systems Principles (SOSP), Oct. 28, 2017, pp. 121-136.

\* cited by examiner

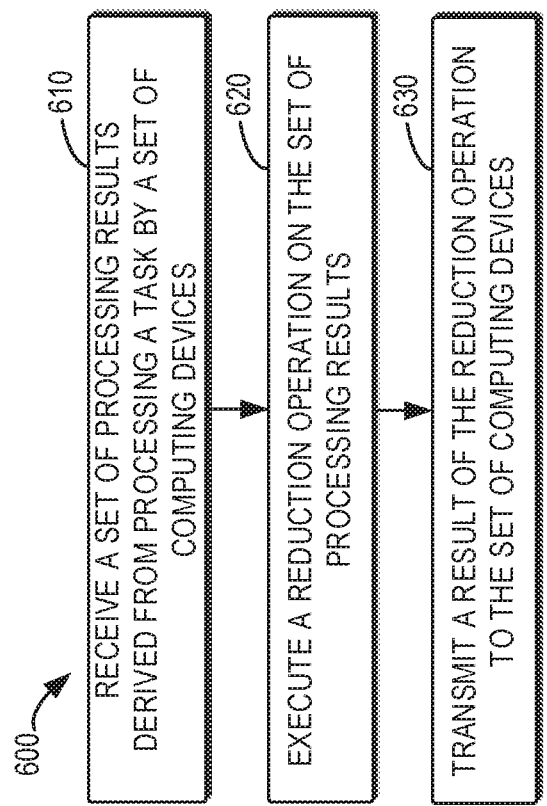

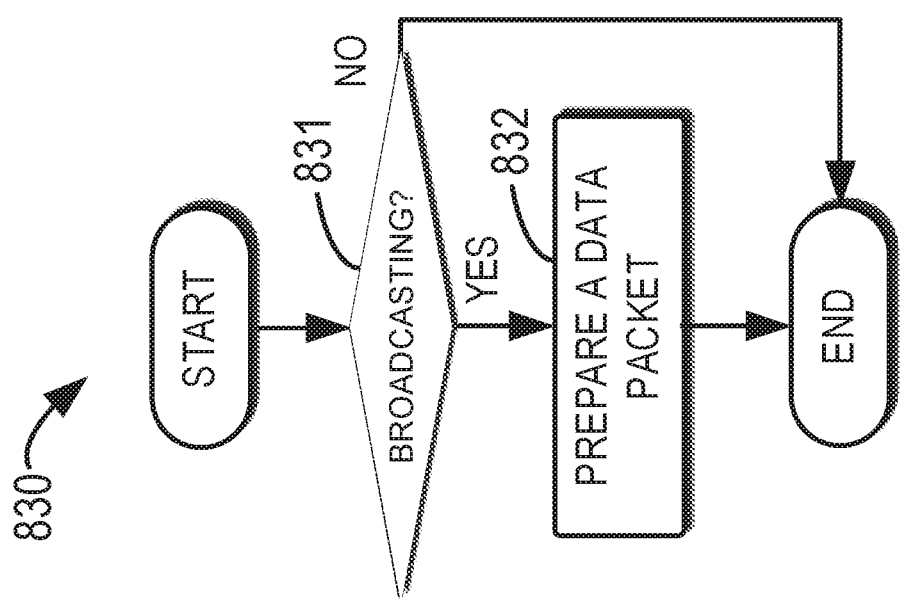

METHODS, DEVICES AND COMPUTER PROGRAM PRODUCTS FOR PROCESSING TASK

RELATED APPLICATIONS

The present application claims priority to Chinese Patent Application No. 201910362877.8, filed Apr. 30, 2019, and entitled "Methods, Devices and Computer Program Products for Processing Task," which is incorporated by reference herein in its entirety.

FIELD

Embodiments of the present disclosure generally relate to the field of data processing, and more specifically, to methods, devices and computer program products for processing a task.

BACKGROUND

With the development of computer technology, computing resources are further diversified, and their computing capacities become more powerful. Due to unique properties, the computing resources are particularly suitable for processing a wide variety of computing tasks. For example, these computing tasks may include deep learning, machine learning, data mining, high performance computing, and the like.

Taking deep learning as an example, accelerating a training process of a deep learning model is critical for research and development. The deep learning model is typically built with a large amount of parameters. Parallel computing with distributed computing resources (for example, Graphics Processing Units (GPUs)) is an important means for reducing the training time. It is possible to achieve higher training speed by expanding the scale of the GPU cluster. However, in a process of jointly completing a training task, it is required to frequently exchange data among a plurality of computing resources for synchronizing parameters derived from the training process. This will occupy a lot of network resources and delay the training process of the deep learning model.

SUMMARY

Embodiments of the present disclosure provide methods, devices and computer program products for processing a task.

In a first aspect of the present disclosure, there is provided a method of processing a task. The method comprises: receiving, at a network device and from a set of computing devices, a set of processing results derived from processing the task by the set of computing devices; in response to receiving the set of processing results, executing a reduction operation on the set of processing results; and transmitting a result of the reduction operation to the set of computing devices.

In a second aspect of the present disclosure, there is provided a method of processing a task. The method comprises: deriving, at a computing device, a processing result from processing the task, the task being processed by a set of computing devices comprising the computing device, and the set of computing devices deriving, from processing the task, a set of processing results comprising the processing result; transmitting, to a network device, the processing result to enable the network device to execute a reduction operation on the set of processing results; and receiving, from the network device, a result of the reduction operation.

In a third aspect of the present disclosure, there is provided a network device. The network device comprises: a processor; and a memory storing computer program instructions, the processor executing the computer program instructions stored in the memory to cause the network device to perform acts. The acts comprising: receiving, from a set of computing devices, a set of processing results derived from processing the task by the set of computing devices; in response to receiving the set of processing results, executing a reduction operation on the set of processing results; and transmitting a result of the reduction operation to the set of computing devices.

In a fourth aspect of the present disclosure, there is provided a computing device. The computing device comprises: a processor; and a memory storing computer program instructions, the processor executing the computer program instructions stored in the memory to cause the computing device to perform acts. The acts comprise: deriving a processing result from processing the task, the task being processed by a set of computing devices comprising the computing device, and the set of computing devices deriving, from processing the task, a set of processing results comprising the processing result; transmitting, to a network device, the processing result to enable the network device to execute a reduction operation on the set of processing results; and receiving, from the network device, a result of the reduction operation.

In a fifth aspect of the present disclosure, there is provided a computer program product. The computer program product is tangibly stored on a non-transient computer storage medium and comprises machine-executable instructions. The machine-executable instructions, when executed by a device, cause the device to perform acts comprising: receiving, at a network device and from a set of computing devices, a set of processing results derived from processing the task by the set of computing devices; in response to receiving the set of processing results, executing a reduction operation on the set of processing results; and transmitting a result of the reduction operation to the set of computing devices.

In a sixth aspect of the present disclosure, there is provided a computer program product. The computer program product is tangibly stored on a non-transient computer storage medium and comprises machine-executable instructions. The machine-executable instructions, when executed by a device, cause the device to perform acts comprising: deriving a processing result from processing the task, the task being processed by a set of computing devices comprising the computing device, and the set of computing devices deriving, from processing the task, a set of processing results comprising the processing result; transmitting, to a network device, the processing result to enable the network device to execute a reduction operation on the set of processing results; and receiving, from the network device, a result of the reduction operation.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which:

FIG. 6 is a flowchart illustrating an example method for processing a task according to embodiments of the present disclosure;

FIG. 8C is a flowchart illustrating an example method for processing an output data packet according to embodiments of the present disclosure;

Throughout the drawings, the same or similar reference symbols refer to the same or similar elements.

DETAILED DESCRIPTION OF EMBODIMENTS

Figure 1:
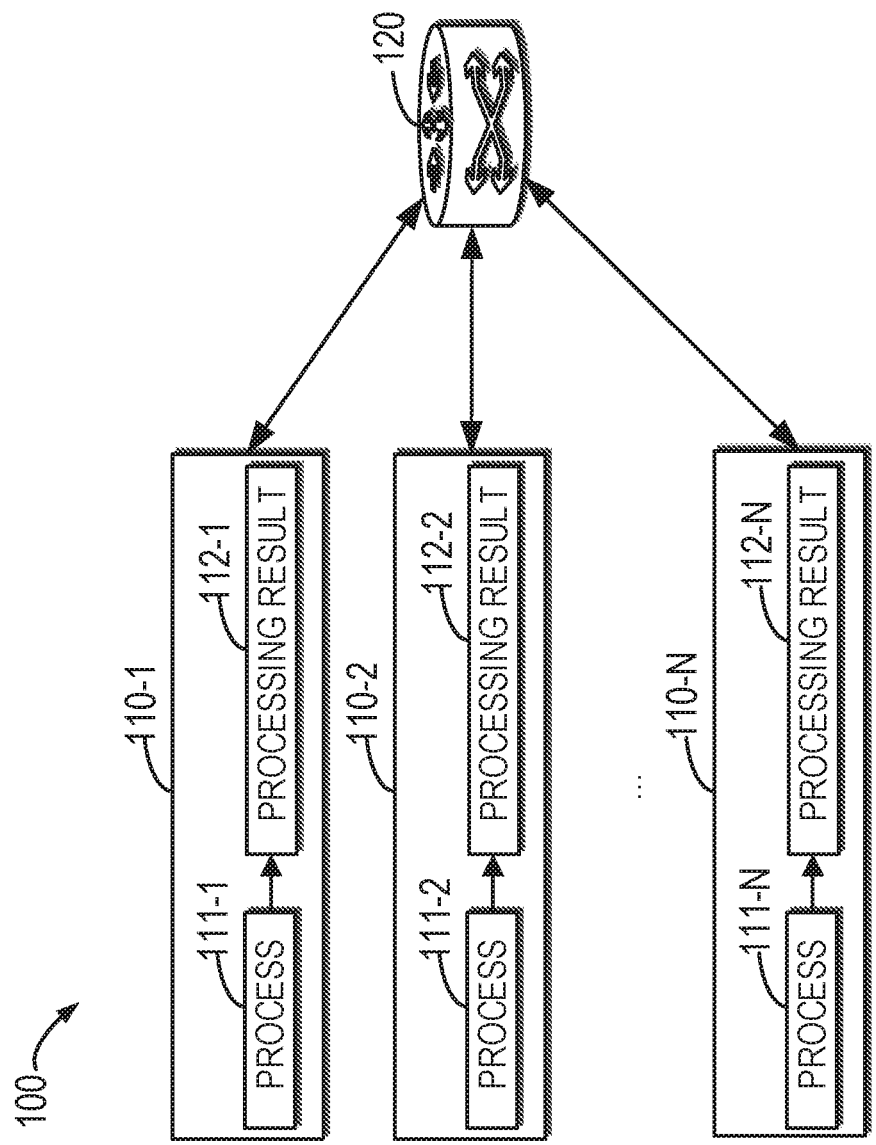
FIG. 1 is a schematic diagram illustrating an example environment for processing a task according to embodiments of the present disclosure.

The conception of the present disclosure will now be described with reference to various example embodiments illustrated in the drawings. It is to be appreciated that description of those embodiments is merely to enable those skilled in the art to better understand and further implement the present disclosure, and is not intended for limiting the scope disclosed herein in any manner. It is worth noting that similar or same reference symbols are employed in the drawings and refer to the same or similar elements. Those skilled in the art will appreciate that alternative embodiments of the structure and/or method described herein may be employed without departing from the principles and conception of the present disclosure.

As used herein, the term "includes" and its variants are to be read as open-ended terms that mean "includes, but is not limited to;" the term "based on" is to be read as "based at least in part on;" the term "an embodiment" is to be read as "at least one example embodiment;" and the term "another embodiment" is to be read as "at least one other embodiment." Other terms probably covered and not mentioned herein, unless clearly indicated otherwise, should not be explained or defined in a way contrary to the conception on which embodiments of the present disclosure are based.

As described above, with the development of computer technology, computing resources are further diversified, and their computing capacities become more powerful. Due to unique properties, the computing resources are particularly suitable for processing a wide variety of computing tasks. For example, these computing tasks may include deep learning, machine learning, data mining, high performance computing, and the like. Taking deep learning as an example, a large amount of parameters are typically required for building a deep learning model, and training of the model may be implemented by computing the large amount of parameters. However, deep learning usually requires a large amount of calculations. Therefore, it is required to distribute the computing task to a plurality of computing resources to complete the computing in parallel, and then integrate the computing results. A reduction operation (such as, an All-Reduce operation) may be employed for integrating the result gained from each computing resource, and the integrated result may be provided to each computing resource, for use in subsequent computing or obtaining the final computing result. In other words, a large amount of data exchange among different processing resources is usually required, in particular when a large number of processing resources are respectively located in computing devices remote from one another. Such data exchange will take up a lot of network resources and reduce the overall efficiency of task processing.

In order to solve the above problem and/or other potential problems, embodiments of the present disclosure provide a solution for processing a task. The solution can receive, at a network device and from a set of computing devices, a set of processing results derived from processing the task by the set of computing devices; in response to receiving the set of processing results, execute a reduction operation on the set of processing results; and transmit a result of the reduction operation to the set of computing devices. In this way, the solution can significantly reduce an amount of data exchanged among a plurality of devices processing a task in parallel, and thus reduce network latency caused by data exchange.

The basic principles and implementations of the present disclosure will be described below with reference to the drawings. It is to be appreciated that the example embodiments are given merely to enable those skilled in the art to better understand and further implement example embodiments disclosed herein and is not intended for limiting the scope disclosed herein in any manner.

FIG. 1 is a schematic diagram of an example environment 100 for processing a task according to embodiments of the present disclosure. As shown in FIG. 1, the environment 100 includes computing devices 110-1, 110-2 . . . 110-N (which are collectively referred to as "computing devices 110" or individually referred to as "computing device 110," where N≥1) and a network device 120. The computing device 110 may communicate with the network device 120 via any wired and/or wireless link.

The computing device 110 may be any device capable of processing a computing task, including, but not limited to, a physical host, a server, a virtual machine, or the like. The network device 120 may be any device capable of forwarding data packets, including, but not limited to, a switch, a router, or the like. In some embodiments, the network device 120 may be a programmable switch. For example, the computing devices 110 and the network device 120 may communicate with each other via User Datagram Protocol (UDP).

Each computing device 110 may include one or more computing resources, for example, general computing resources and/or dedicated computing resources. An example of a computing resource may include, but is not limited to, a Central Processing Unit (CPU). Examples of a dedicated computing resource may include, but are not limited to, a Graphics Processing Unit (GPU), a Field Programmable Gate Array (FPGA), an Artificial Intelligence (AI) processor, and the like. The plurality of computing devices 110 may be assigned with a computing task, such as training a deep learning model. Each computing device 110 may execute one or more computing processes using one or more computing resources included therein, for processing the assigned computing task.

For the purpose of simplification, in FIG. 1, each computing device 110 is shown to include only one computing process. For example, the computing device 110-1 includes a computing process 111-1 which obtains a processing result 112-1 by processing the assigned computing task; the computing device 110-2 includes a computing process 111-2 which obtains a processing result 112-2 by processing the assigned computing task; . . . and the computing device 110-N includes a computing process 111-N which obtains a processing result 112-N by processing the assigned computing task. The computing processes 111-1, 111-2 . . . 111-N are collectively referred to as "computing processes 111" or individually referred to as "computing process 111." The processing results 112-1, 112-2 . . . 112-N are collectively referred to as "processing results 112" or individually referred to as "processing result 112." It is to be appreciated that this is provided only as an example, without any intention of limiting the scope of the present disclosure. In some embodiments, each computing device 110 may execute a plurality of computing processes, so as to obtain a plurality of processing results.

The plurality of computing devices 110 may send the plurality of processing results 112 to the network device 120. The network device 120 may execute a reduction operation (such as, an AllReduce operation) on the received plurality of processing results 112. The network device 120 may send a result of the reduction operation to the plurality of computing devices 110.

Figure 2A:
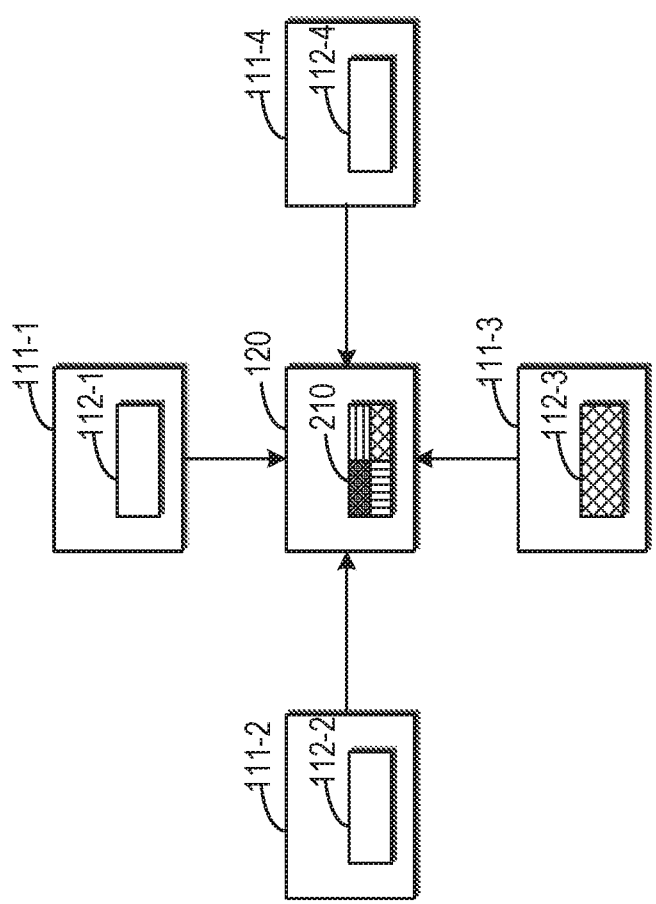
FIGS. 2A and 2B are schematic diagrams illustrating task processing according to embodiments of the present disclosure.
Figure 2B:
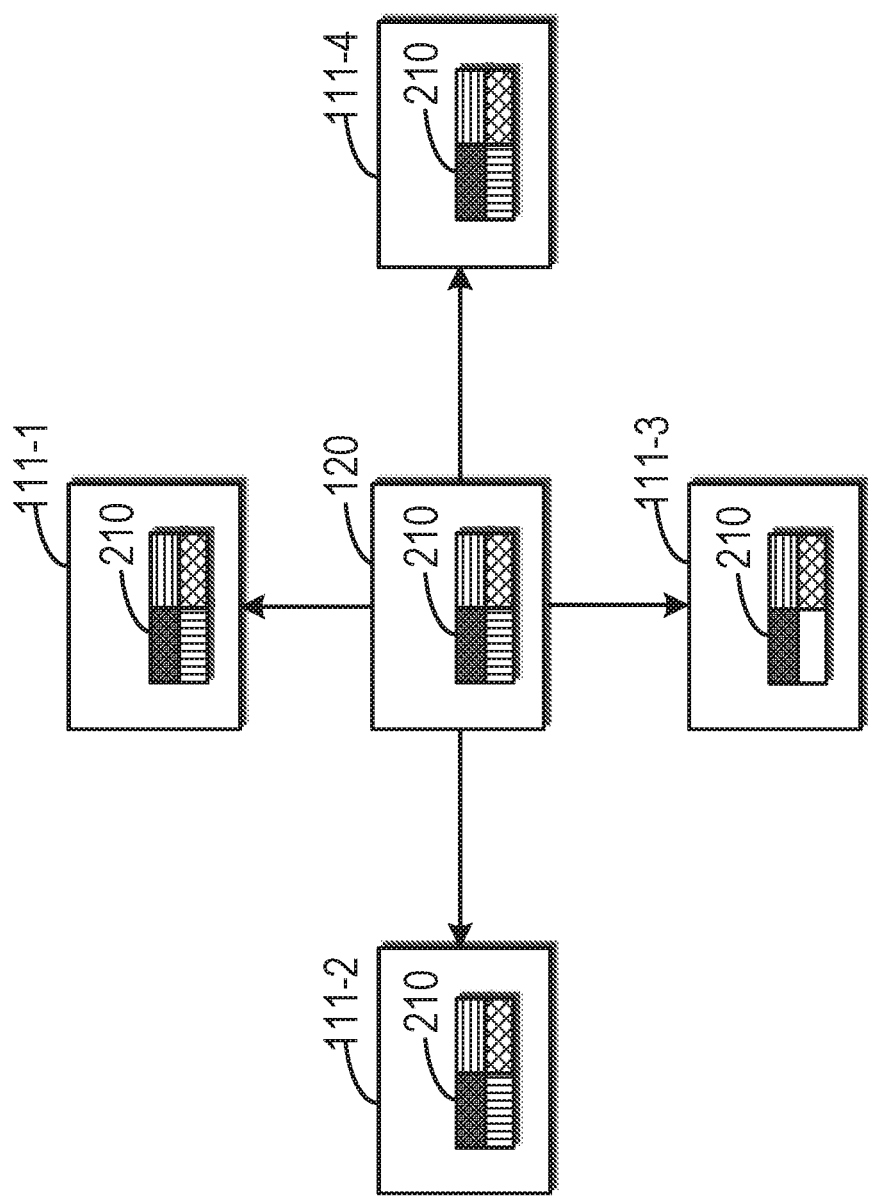

FIGS. 2A and 2B are schematic diagrams illustrating task processing according to embodiments of the present disclosure. In FIGS. 2A and 2B, four computing processes are shown. It is to be appreciated that this is provided merely as an example, without any intention of limiting the scope of the present disclosure. As shown in FIG. 2A, the computing processes 111-1, 111-2, 111-3 and 111-4 obtain the respective processing results 112-1, 112-2, 112-3 and 112-4 by processing the assigned computing task. The computing processes 111-1, 111-2, 111-3 and 111-4 may send the processing results 112-1, 112-2, 112-3 and 112-4 to the network device 112 (for example, a switch). The network device 120 executes the reduction operation (for example, summing, averaging, and the like) on the received processing results 112-1, 112-2, 112-3 and 112-4, to obtain a result 210 of the reduction operation (which is hereinafter referred to as "reduction result 210"). As shown in FIG. 2B, the network device 120 may send the reduction result 210 back to respective computing processes 111-1, 111-2, 111-3 and 111-4.

In some embodiments, the network device 120 may be implemented as a programmable switch. The network device 120 may broadcast the reduction result 210 to respective computing processes 111-1, 111-2, 111-3 and 111-4. By utilizing the broadcast mechanism of the switch, the parameter exchanging process in the deep learning training can be simpler and faster. It is seen from FIGS. 2A and 2B that, if the number of computing processes is N and the amount of data covered in each processing result is P, the amount of data to be sent and received in each computing process is N*P.

However, many modern programmable switches do not support a loop process in programming. In the meantime, the programmable switch is not able to perform floating-point calculations, because there is no floating-point coprocessor for float-point calculation available in the chip. In addition, the on-chip memory of the switch is typically of a small size, which may restrict the capability of holding a large number of values on the programmable switch or performing fast processing on them.

In some embodiments, in order to overcome the above restrictions on the programmable switch, prior to transmitting the processing result 112 to the network device 120, the computing process 111 may perform pre-processing on the processing result 112, to make the pre-processed processing result suitable for the reduction operation to be executed by the network device 120.

In some embodiments, the pre-processing executed by the computing process 111 may include one or more of the following: converting the processing result into a predetermined value range; converting the processing result from a negative value to a positive value; and converting the processing result from a floating point number to an integer. For example, it is assumed that a processing result (for example, a gradient) obtained by a certain computing process 111 at time t is represented as $g_r^{(t)}$, where r represents an index ($r \in [1, N]$) in the computing process. In some embodiments, the computing process 111 may convert the processing result $g_r^{(t)}$ into a predetermined value range $[-K, K]$. For example, if $g_r^{(t)} > K$, $g_r^{(t)} = K$; and if $g_r^{(t)} \leq g_r^{(t)} = -K$. Alternatively, or in addition, in some embodiments, the computing process 111 may convert the processing result from a negative value to a positive value by adding a bias to the processing result $g_r^{(t)}$, i.e., $g_r^{(t)'} = g_r^{(t)} + bias$. Alternatively, or in addition, in some embodiments, the computing process 111 may include converting, by multiplying the processing result $g_r^{(t)'}$ by a certain numerical value E, the processing result from a floating point number into an integer, i.e., $g_r^{(t)''} = int(g_r^{(t)'} * E)$. Then, the computing process may transmit the pre-processed processing result $g_r^{(t)''}$ to the network device 120.

In some embodiments, the network device 120 may execute the reduction operation on the received pre-processed processing results. The reduction operation, for example, may include a summing operation, an averaging operation, and the like. In some embodiments, taking a summing operation as an example, the network device 120 may sum up the processing results received from respective computing processes 111 to derive the result of the reduction operation: $g^{(t)} = \sum_{r=1}^{N} g_r^{(t)''}$. The network device 120 may broadcast the result of the reduction operation to the computing processes 111, respectively.

In some embodiments, in response to receiving the result of the reduction operation, the computing process 111 may perform post-processing opposite to the pre-processing on the result of the reduction operation. For example, the computing process 111 may subtract bias*N*E from the received reduction result $g^{(t)}$, and then convert the derived value from an integer to a floating point number, i.e., $g_r^{(t)'}$=float $(g^{(t)}-\text{bias}*N*E)$. Then, the computing process 111 may divide $g_r^{(t)'}$ by E, so as to derive $g_r^{(t)''}: g_r^{(t)''}=g_r^{(t)'}/E$. The computing process 111 may execute, based on the derived gradient $g_r^{(t)''}$, a subsequent computing task (for example, computing a new model parameter, and the like).

Figure 3:
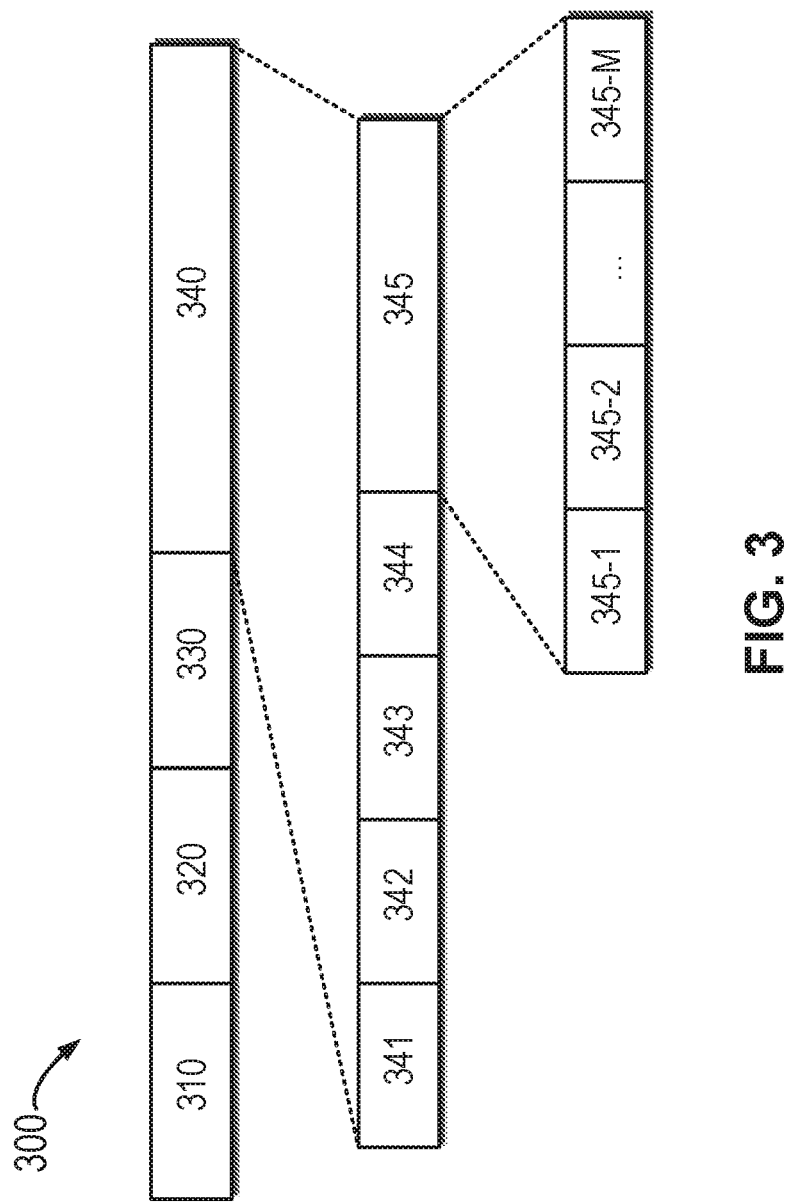
FIG. 3 is a schematic diagram illustrating an example data packet structure for implementing data exchange between computing devices and a network device according to embodiments of the present disclosure.

In some embodiments, the communication between the computing process 111 and the network device 120 may be implemented, for example, based on UDP. FIG. 3 is a schematic diagram of an example structure of a data packet 300 for implementing data exchange between computing devices and a network device according to embodiments of the present disclosure. As shown in FIG. 3, the data packet 300 may include an Ethernet header 310, an IP header 320, a UDP header 330 and a UDP payload 340. The UDP payload 340 may include a task identifier 341, a maximum number 342 of computing processes involved in the task, a process identifier 343, a serial number 344 of a data packet transmitted by the process, and a processing result 345. The processing result 345, for example, may include one or more values 345-1, 345-2 . . . 345-M (where M≥1).

In some embodiments, in case that no transmission failure occurs, the communication between the computing devices and the network device typically includes the following: an initialization process, a process for transmitting a processing result, and a process for transmitting a reduction result. Since the UDP is an unreliable transmission protocol, it is required to introduce some mechanisms to ensure the reliability of the transmission.

Figure 4A:
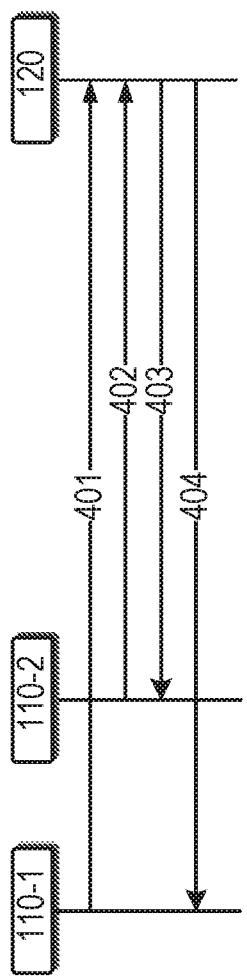
FIGS. 4A and 4B are schematic diagrams illustrating an initialization process according to embodiments of the present disclosure.
Figure 4B:
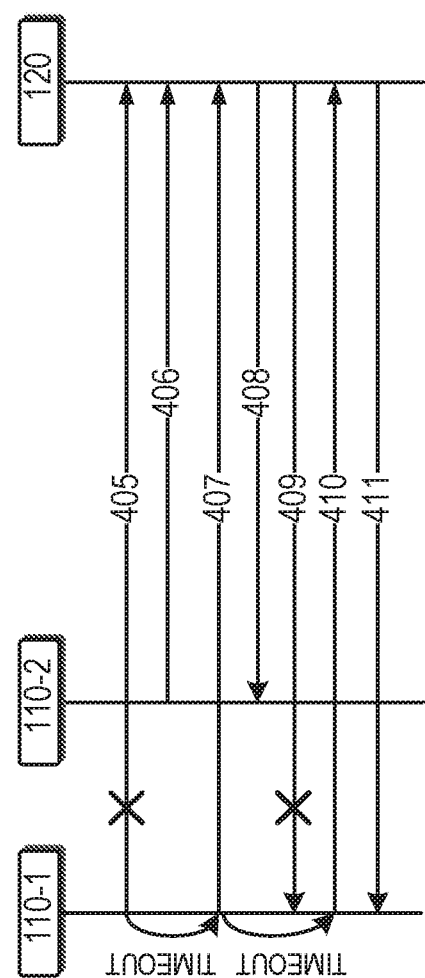

FIGS. 4A and 4B are schematic diagrams of an initialization process according to embodiments of the present disclosure. In the examples as shown in FIGS. 4A and 4B, for simplification and illustration, it is assumed that the number N of the computing devices (computing processes) is equal to 2.

FIG. 4A illustrates a case that no transmission failure occurs. As shown in FIG. 4A, in some embodiments, initially, the computing device 110-1 may transmit 401 an initialization request to the network device 120. Likewise, the computing device 110-2 may transmit 402 an initialization request to the network device 120. The network device 120 may maintain a set of flags indicating respective states of computing processes 111 in the computing devices 110 (for example, a bitmap in which each bit corresponds to a computing process and indicates whether a processing result from the computing process is received). When the network device 120 receives initialization requests from all of the computing devices 110, the network device 120 may initialize the set of flags (for example, clearing each of the set of flags to indicate that no processing result has been received from any computing process 111). In addition, the network device 120 may extract, from the received initialization requests, network information related to respective computing processes, such as, MAC addresses, IP addresses, port numbers, and the like. Thereafter, the network device 120 may receive, based on the extracted network information, processing results from respective processing processes. As shown in FIG. 4A, in response to receiving the initialization requests from all of the computing devices 110, the network device 120 may broadcast (as shown by 403 and 404) a response to the initialization requests to each of the computing devices 110. For example, the response may indicate that the network device 120 is ready to receive the processing results from respective computing devices 110.

FIG. 4B illustrates a case that a transmission failure occurs. As shown in FIG. 4B, initially, the computing device 110-1 may transmit 405 an initialization request to the network device 120, and the computing device 110-2 may transmit 406 an initialization request to the network device 120. If a packet loss failure occurs in the initialization request transmitted from the computing device 110-1, the computing device 110-1 may retransmit 407 the initialization request if a preset timeout period (which is referred to as a "second threshold period" herein) expires. When the network device 120 receives the initialization requests from the computing devices 110-1 and 110-2, the network device 120 may broadcast (as shown by 408 and 409) responses to the initialization requests to the computing devices 110-1 and 110-2, respectively. If a packet loss failure occurs in the response transmitted to the computing device 110-1, the computing device 110-1 may retransmit 410 the initialization request if a preset timeout period expires. In response to receiving the initialization request from the computing device 110-1 again, the network device 120 may retransmit (for example, unicast) 411 the response to the computing device 110-1. In this way, the transmission reliability of the initialization process can be ensured.

Figure 5A:
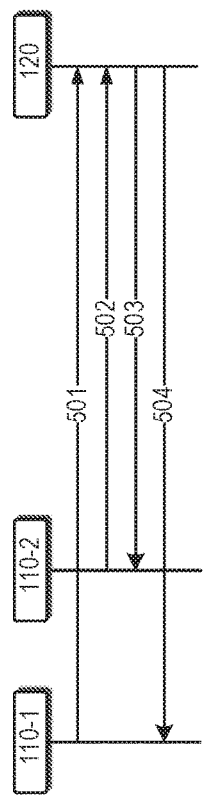
FIGS. 5A-5C are schematic diagrams illustrating a transmission process of processing results and a reduction result.
Figure 5B:
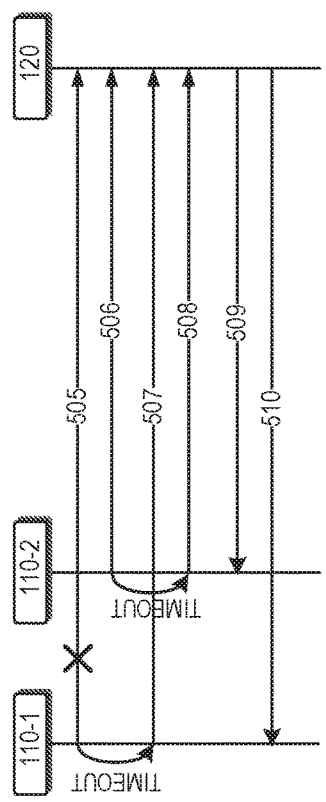
Figure 5C:
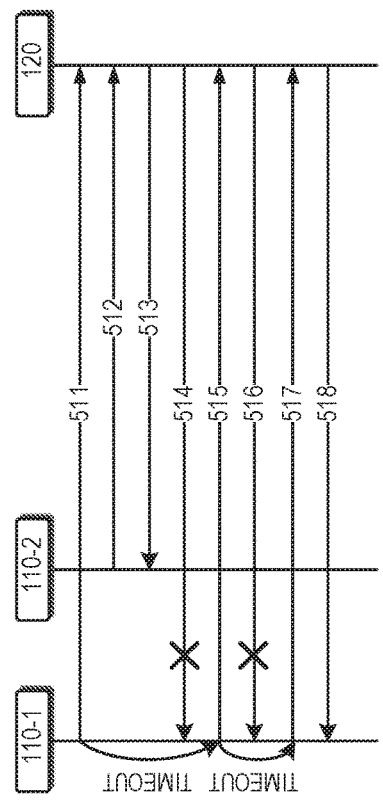

FIGS. 5A-5C are schematic diagrams illustrating processes for transmitting processing results and a reduction result. In the examples as shown in FIGS. 5A-5C, for the purpose of simplification and illustration, it is assumed that the number of computing devices (computing processes) is equal to 2.

FIG. 5A illustrates a case that no transmission failure occurs. As shown in FIG. 5A, in some embodiments, initially, the computing device 110-1 may transmit 501 a processing result to the network device 120. The computing device 110-2 may likewise transmit 502 a processing result to the network device 120. When receiving processing results from all of the computing devices 110, the network device 120 may broadcast (as shown by 503 and 504) a result of the reduction operation to each of the computing devices 110.

FIG. 5B illustrates a case that a transmission failure occurs. As shown in FIG. 5B, initially, the computing device 110-1 may transmit 505 a processing result to the network device 120, and the computing device 110-2 may transmit 506 a processing result to the network device 120. If a packet loss failure occurs in the processing result transmitted by the computing device 110-1, the computing device 110-1 may retransmit 507 the processing result if a preset timeout period (which is also referred to as a "first threshold period" herein) expires. Since the network device 120 does not receive processing results from all of the computing devices within a predetermined period, no reduction result will be broadcasted. Therefore, although no packet loss occurs in the processing result transmitted by the computing device 110-2, the computing device 110-2 may not receive the reduction result from the network device 120 before the preset timeout period expires. The computing device 110-2 may retransmit 508 the processing result in response to the pre-set timeout period expiring, accordingly. In response to receiving processing results from all of the computing devices 110, the network device 120 may broadcast (as shown by 509 and 510) the result of the reduction operation to each of the computing devices 110.

FIG. 5C illustrates a further case that a transmission failure occurs. As shown in FIG. 5C, initially, the computing device 110-1 may transmit 511 a processing result to the network device 120; and likewise, the computing device 110-2 may transmit 512 a processing result to the network device 120. In response to receiving processing results from all of the computing devices 110, the network device 120 may broadcast (as shown by 513 and 514) the result of the reduction operation to the respective computing devices 110. If a packet loss occurs in the reduction result transmitted to the computing device 110-1, the computing device 110-1 may retransmit 515 the processing result if the preset timeout period expires. In response to receiving the processing result from the computing device 110-1 again, the network device 120 may retransmit (for example, unicast) 516 the result of the reduction operation to the computing device 110-1. If a packet loss occurs again in the result of the reduction operation transmitted to the computing device 110-1, the computing device 110-1 may retransmit 517 the processing result if the preset timeout period expires. In response to receiving the processing result from the computing device 110-1 again, the network device 120 may retransmit (for example, unicast) 518 the result of the reduction operation to the computing device 110-1. In this way, the transmission reliability of the processing results and the reduction result can be ensured.

FIG. 6 illustrates a flowchart of an example method 600 of processing a task according to embodiments of the present disclosure. For example, the method 600 may be implemented at the network device 120 as shown in FIG. 1. It is to be understood that the method 600 may include additional acts not shown and/or omit the shown acts. The scope of the present disclosure is not limited in this aspect.

As shown in FIG. 6, at block 610, the network device 120 receives, from a set of computing devices 110, a set of processing results derived from processing a task by the set of computing devices 110.

At block 620, the network device 120 executes, in response to receiving a set of processing results, a reduction operation on the set of processing results.

At block 630, the network device 120 transmits a result of the reduction operation to the set of computing devices 110.

In some embodiments, the network device 120 may be implemented as a programmable switch.

In some embodiments, the set of computing devices 110 comprises a first computing device (for example, the computing device 110-1 as shown in FIG. 5C), and the set of processing results comprises a first processing result transmitted from the first computing device. In some embodiments, after transmitting the result of the reduction operation to the set of computing devices 110, in response to receiving the first processing result (for example, as shown by 517 in FIG. 5C) again from the first computing device, the network device 120 may retransmit (for example, shown by 518 in FIG. 5C) the result of the reduction operation to the first computing device.

In some embodiments, before receiving the set of processing results, the network device 120 may receive, from the set of computing devices 110, a set of requests (for example, the initialization requests as described above with reference to FIGS. 4A and 4B) for executing the reduction operation.

In some embodiments, the network device 120 may determine, based on the received set of requests, respective network information of the set of computing devices 110. The network device 120 may receive, based on the respective network information of the set of computing devices 110, the set of processing results from the set of computing devices.

In some embodiments, in response to receiving the set of requests, the network device 120 may transmit, to each of the set of computing devices, a response to the set of requests.

In some embodiments, the set of computing devices 110 may comprise a second computing device (for example, the computing device 110-1 as shown in FIG. 4B), and the set of requests may comprise a second request transmitted from the second computing device. After transmitting the response to each of the set of computing devices 110, in response to receiving the second request (as shown by 410 in FIG. 4B) again from the second computing device, the network device 120 may retransmit the response (as shown by 411 in FIG. 4B) to the second computing device.

Figure 7:
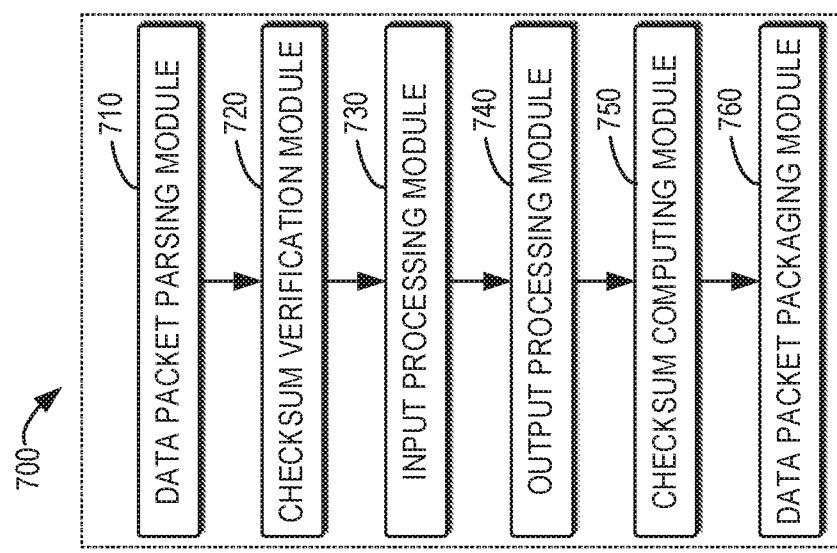
FIG. 7 is a block diagram illustrating an example device for processing a task according to embodiments of the present disclosure.

FIG. 7 is a block diagram of an example device 700 for processing a task according to an embodiment of the present disclosure. For example, the network device 120 may be implemented by the device 700. As shown in FIG. 7, the device 700 may include a data packet parsing module 710, a checksum verification module 720, an input processing module 730, an output processing module 740, a checksum computing module 750 and a data packet packaging module 760. It is to be appreciated that respective modules of the device 700 may be hardware modules, or software modules. For example, in some embodiments, the device 700 may be implemented entirely or partly in software and/or firmware, for example, implemented as a computer program product included on a computer readable medium. Alternatively or in addition, the device 700 may be implemented entirely or partly in hardware, for example, implemented as an Integrated Circuit (IC), an Application-Specific Integrated Circuit (ASIC), a System on a Chip (SOC), a Field Programmable Gate Array (FPGA), or the like. The scope of the present disclosure is not limited in this aspect.

Figure 8A:
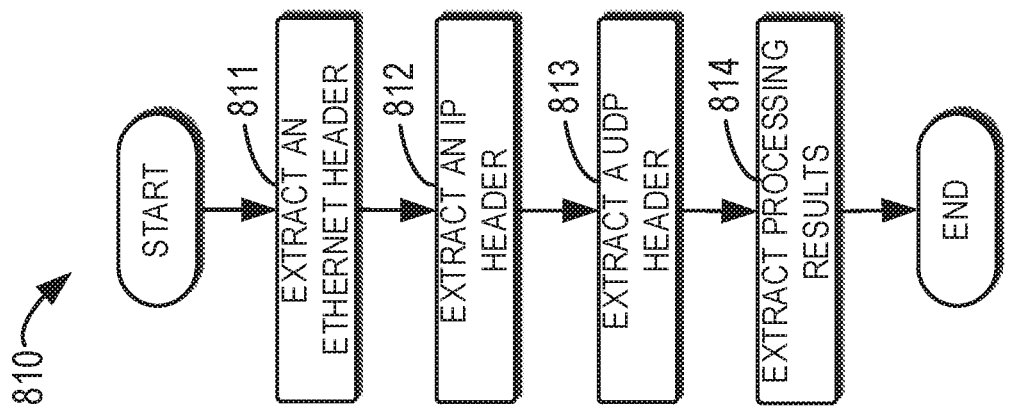
FIG. 8A is a flowchart illustrating an example method of parsing a data packet according to embodiments of the present disclosure.

In some embodiments, the data packet parsing module 710 is configured to parse a received data packet (for example, the data packet 300 as shown in FIG. 3), to extract a processing result contained therein. In this aspect, FIG. 8A is a flowchart illustrating an example method 810 of parsing a data packet according to embodiments of the present disclosure. The method 810, for example, may be executed by the data packet parsing module 710 as shown in FIG. 7. As shown in FIG. 8A, at block 811, the data packet parsing module 710 extracts an Ethernet header (for example, the Ethernet header 310 as shown in FIG. 3) from the data packet. At block 812, the data packet parsing module 710 extracts an IP header (for example, the IP header 320 as shown in FIG. 3) in the data packet. At block 813, the data packet parsing module 710 extracts a UDP header (for example, the UDP header 330 as shown in FIG. 3) in the data packet. At block 814, the data packet parsing module 710 extracts, from a UDP payload, a processing result (for example, the processing result 345 as shown in FIG. 3).

In some embodiments, the checksum verification module 720 is configured to verify checksums in respective headers (for example, the Ethernet header, the IP header and the UDP header), to ensure integrity and accuracy of the received data.

Figure 8B:
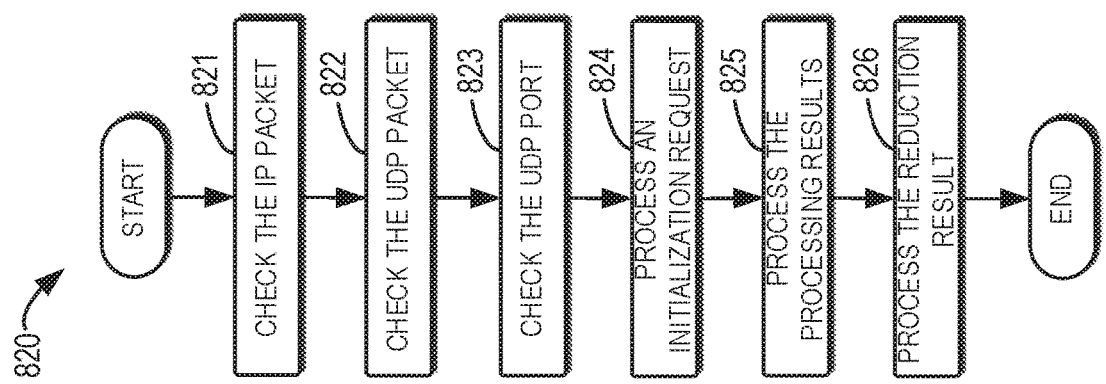
FIG. 8B is a flowchart illustrating an example method of processing an input data packet according to embodiments of the present disclosure.

In some embodiments, the input processing module 730 is configured to process the received data packet. In this aspect, FIG. 8B is a flowchart illustrates an example method 820 of processing an input data packet according to embodiments of the present disclosure. The method 820, for example, may be executed by the input processing module 730 as shown in FIG. 7. As shown in FIG. 8B, at block 821, the input processing module 730 verifies whether the IP packet is valid. At block 822, the input processing module 730 verifies whether the UDP packet is valid. At block 823, the input processing module 730 determines, by verifying the UDP port, whether it is a target data packet to be processed (for example, an initialization request data packet, or a processing result data packet). If the data packet is an initialization request data packet, at block 824, the input processing module 730 processes the initialization request, for example, initializing receiving flags, extracting and storing network information, and the like, as described above with reference to FIG. 4A. If the data packet includes processing results, at block 825, the input processing module 730 processes the processing results, for example, executing the corresponding reduction operation on the processing results, and the like. Then, at block 826, the input processing module 730 processes the reduction result. For example, the input processing module 730 may determine whether the processing results from all of the processing processes are received and reduced. If yes, a broadcast flag is set to be enabled; if no, the broadcast flag is set to be disabled.

In some embodiments, the output processing module 740 is configured to prepare broadcast of the reduction result. In this aspect, FIG. 8C is a flowchart illustrating an example method 830 of processing an output data packet according to an embodiment of the present disclosure. The method 830, for example, may be executed by the output processing module 740 as shown in FIG. 7. As shown in FIG. 8C, at block 831, the output processing module 740 determines whether the broadcast flag is enabled. If enabled, at block 832, the output processing module 740 prepares a data packet for broadcast. Particularly, if the reduction result has been broadcast, the broadcast flag is still in the enabled state. Then, at block 832, the output processing module 740 prepares a data packet for unicast, based on the network information of the computing device from which its processing result is received once again.

In some embodiments, the checksum computing module 750 is configured to compute checksums required by respective headers for the data packet to be transmitted.

Figure 8D:
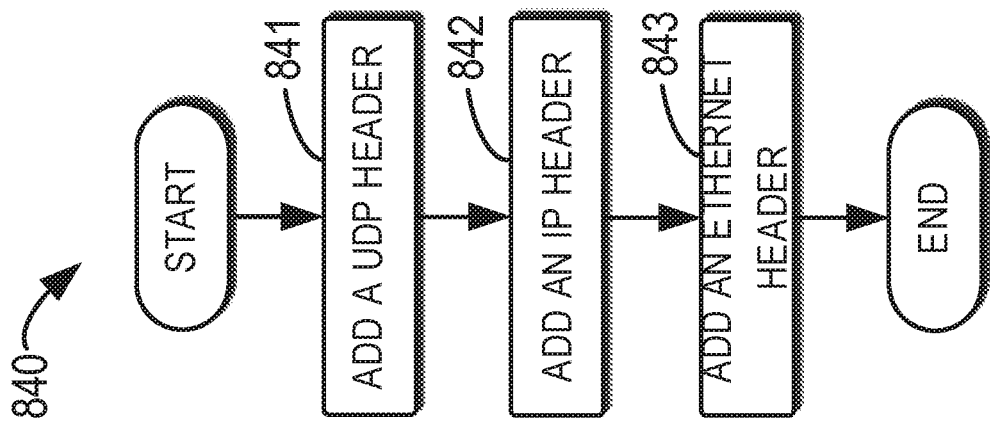
FIG. 8D is a flowchart of an example method of packaging an output data packet according to embodiments of the present disclosure.

In some embodiments, the data packet packaging module 760 is configured to add respective headers to the data packet to be transmitted. In this aspect, FIG. 8D is a flowchart illustrating an example method 840 of packaging an output data packet according to embodiments of the present disclosure. The method 840, for example, may be executed by the data packet packaging module 760 as shown in FIG. 7. As shown in FIG. 8D, at block 841, the data packet packaging module 760 adds a UDP header to a reduction result data packet to be transmitted. At block 842, the data packet packaging module 760 adds an IP header to the reduction result data packet to be transmitted. At block 843, the data packet packaging module 760 adds an Ethernet header to the reduction result data packet for transmission.

It is to be appreciated that the respective modules 710-760 as shown in FIG. 7 and the example methods as shown in FIGS. 8A-8D are provided merely as examples, without any intention of limiting the scope of the present disclosure. In some embodiments, the device 700 may include modules not shown in FIG. 7 or may omit some modules as shown therein. In this case, the processes or methods executed by the modules in the device 700 may be different than those as shown in FIGS. 8A-8D.

Figure 9:
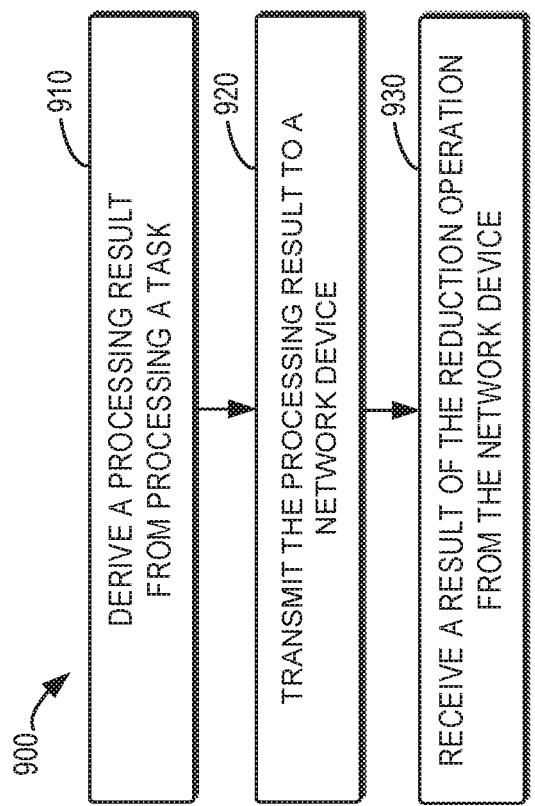
FIG. 9 is a flowchart of an example method of processing a task according to embodiments of the present disclosure.

FIG. 9 is a flowchart illustrating an example method 900 of processing a task according to embodiments of the present disclosure. For example, the method 900 may be implemented at the computing device 110. It is to be appreciated that the method 900 may include additional acts not shown and/or may omit some shown acts, and the scope of the present disclosure is not limited in this aspect.

As shown in FIG. 9, at block 910, the computing device 110 derives a processing result from processing a task. The task may be processed by a set of computing devices including the computing device 110, and the set of computing devices derive, from processing the task, a set of processing results including the processing result.

At block 920, the computing device 110 transmits the processing result to the network device 120. The network device 120 may execute a reduction operation on the set of processing results received from the set of computing devices.

At block 930, the computing device 110 receives a result of the reduction operation from the network device 120.

In some embodiments, the network device 120 may be implemented as a programmable switch.

In some embodiments, the computing device 110 may transmit the processing result to the network device 120 by pre-processing the processing result such that the pre-processed processing result is adapted for the reduction operation to be executed by the network device 120; and transmitting the pre-processed processing result to the network device 120.

In some embodiments, the pre-processing includes at least one of the following: converting the processing result into a predetermined value range; converting the processing result from a negative value into a positive value; and converting the processing result from a floating point number into an integer.

In some embodiments, in response to receiving the result of the reduction operation, the computing device 110 performs post-processing opposite to the pre-processing on the result of the reduction operation.

In some embodiments, in response to failing to receive the result of the reduction operation within a first threshold period after transmitting the processing result, the computing device 110 retransmits the processing result (as shown by 507 or 508 in FIG. 5B, and 515 or 517 in FIG. 5C) to the network device 120.

In some embodiments, the computing device 110 transmits a request for executing the reduction operation to the network device 120 before transmitting the processing result. In response to receiving a response to the request from the network device 120, the computing device 110 transmits the processing result to the network device 120.

In some embodiments, in response to failing to receive the response to the request within a second threshold period after transmitting the request, the computing device 110 retransmits the request (as shown by 407 or 410 in FIG. 4B) to the network device 120.

Figure 10:
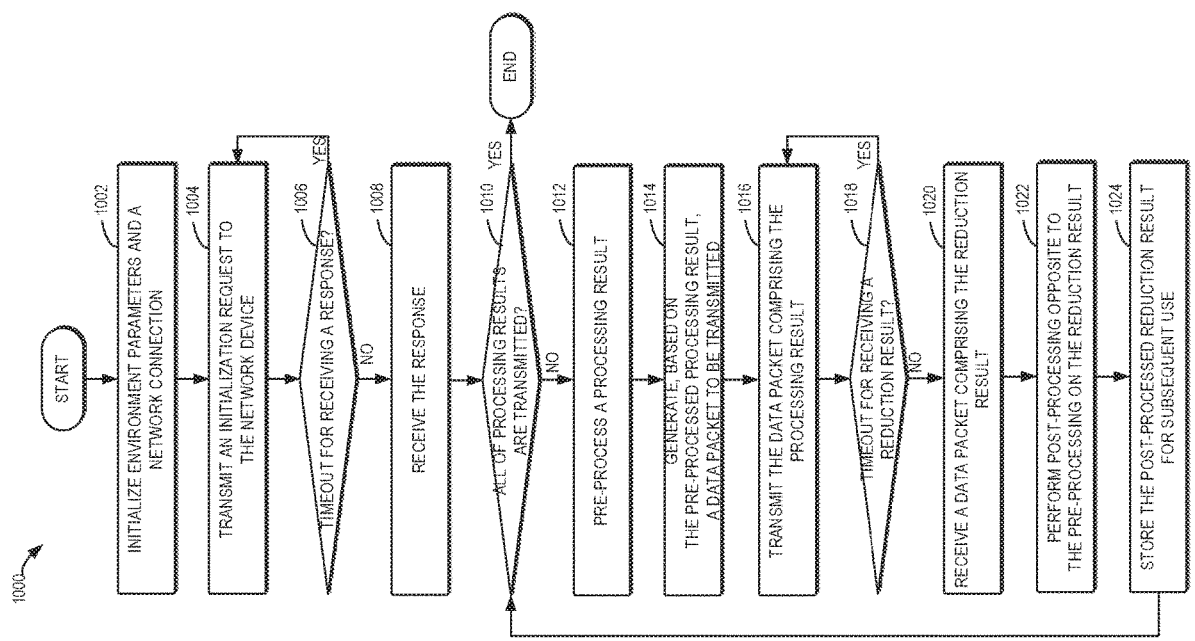
FIG. 10 is a flowchart of an example method of processing a task according to embodiments of the present disclosure.

FIG. 10 is a flowchart illustrating an example method 1000 of processing a task according to an embodiment of the present disclosure. For example, the method 1000 may be implemented at the computing device 110 as shown in FIG. 1. The method 1000 may be regarded as an example implementation of the method 900. It is to be appreciated that the method 1000 may further include additional acts not shown and/or may omit some shown acts, and the scope of the present disclosure is not limited in this aspect. At block 1002, the computing device 110 initializes environmental parameters and a network connection. In some embodiments, the computing device 110 may obtain, using a specific interface, one or more environmental parameters, such as information on a task (for example, a task identifier, a maximum number of computing processes involved in the task, identifiers of the computing processes, and the like). In addition, the computing device 110 may initialize an UDP socket connection and set receive timeout for the UDP socket.

At block 1004, the computing device 110 may transmit an initialization request to the network device 120.

At block 1006, if the computing device 110 has not received a response to the request within a threshold period, the method 1000 returns to block 1004, where the computing device 110 may retransmit the initialization request to the network device 120.

At block 1008, the computing device 110 may receive a response to the initialization request from the network device 120.

At block 1010, the computing device 110 determines whether all of the processing results derived from processing the task have been transmitted. In some embodiments, when an amount of data of the processing results exceeds the maximum amount of data indicated by both the Maximum Transmission Unit (MTU) of the network and the bit width of an integer, the computing device 110 may partition the processing result into chunks and process only one chunk every time. If all of the chunks of the processing result are transmitted, the method 1000 ends.

Otherwise, the method 1000 proceeds to block 1012, where the computing device 110 pre-processes a chunk of the processing result, such that the pre-processed processing result is adapted for the reduction operation to be executed by the network device 120. In some embodiments, the pre-processing includes at least one of the following: converting the processing result into a predetermined value range; converting the processing result from a negative value into a positive value; and converting the processing result from a floating point number into an integer.

At block 1014, the computing device 110 generates, based on the pre-processed processing result, a data packet to be transmitted. For example, the computing device 110 may build a processing result data packet, based on the task identifier (for example, the task identifier 341 as shown in FIG. 3) obtained at block 1002, a maximum number of processing processes involved in the task (for example, the maximum number 342 of the processing processes as shown in FIG. 3), a computing process identifier (for example, the process identifiers 343 as shown in FIG. 3), the current chunk index of the processing result being processed (for example, the serial number 344 of the data packet as shown in FIG. 3), and one or more values of the processing result (for example, the processing result 345 as shown in FIG. 3).

At block 1016, the computing device 110 transmits, to the network device 120, the data packet including the processing result.

At block 1018, if the computing device 110 fails to receive the reduction result within a threshold period, the method 1000 returns to the block 1016, where the computing device 110 retransmits the data packet to the network device 120.

At block 1020, the computing device 110 receives, from the network device 120, a data packet including the reduction result.

At block 1022, the computing device 110 executes post-processing opposite to the pre-processing on the received data packet.

Then, at block 1024, the computing device 110 may store the post-processed reduction result for subsequent use.

It is seen from the above description that the embodiments of the present disclosure can significantly reduce an amount of data exchanged among a plurality of devices processing a task in parallel, and thus reduce network latency caused by data exchange.

Figure 11:
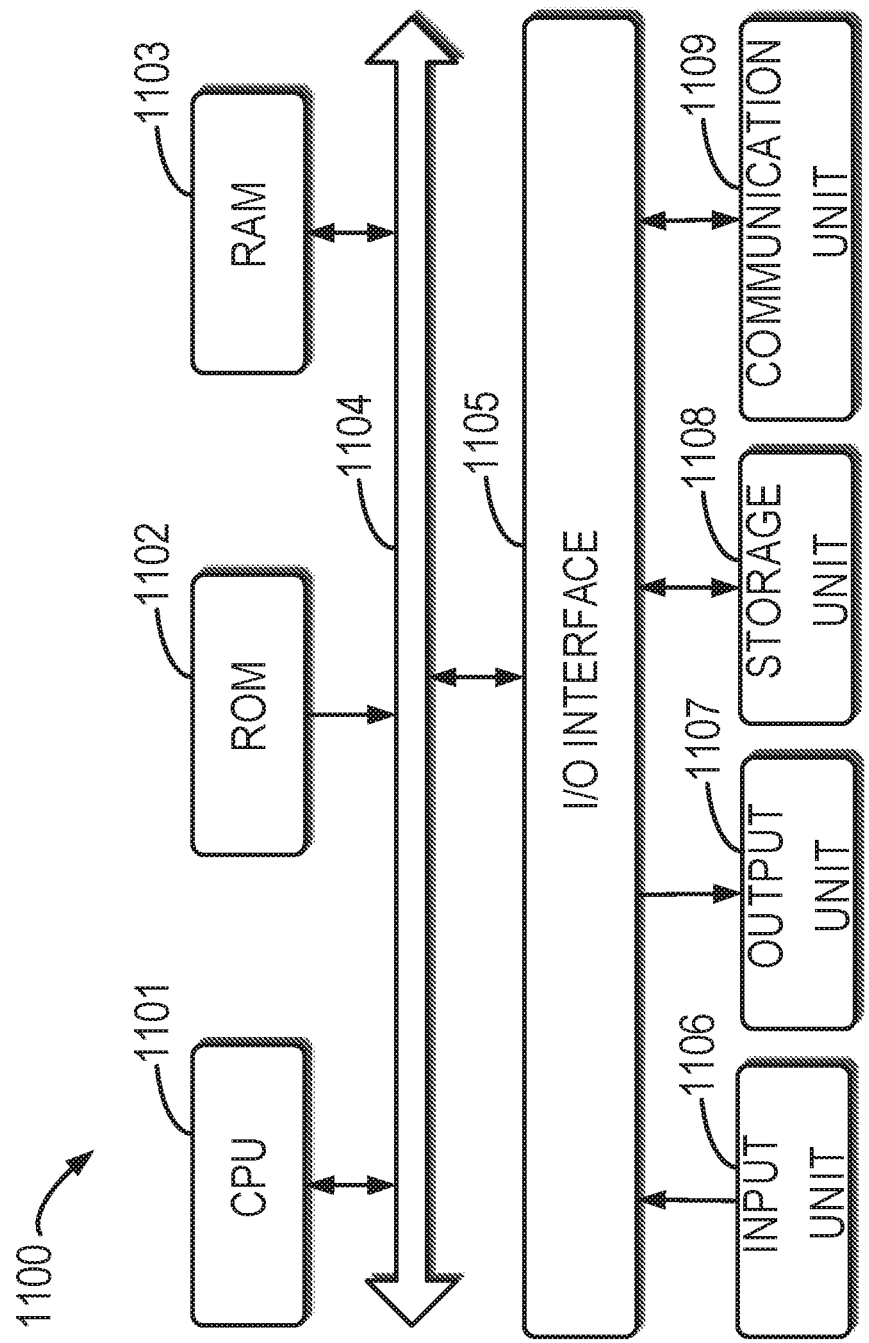
FIG. 11 is a schematic block diagram illustrating a device that can be used to implement embodiments of the present disclosure.

FIG. 11 illustrates a schematic block diagram of a device 1100 that can be used to implement embodiments of the present disclosure. The device 1100 may be used to implement the computing device 110 or the network device 120 as described with reference to FIG. 1. As shown, the device 1100 includes a central processing unit (CPU) 1101 that can perform various appropriate acts and processing based on computer program instructions stored in a read-only memory (ROM) 1102 or computer program instructions loaded from a storage unit 1108 to a random access memory (RAM) 1103. In the RAM 1103, there further store various programs and data needed for operations of the device 1100. The CPU 1101, ROM 1102 and RAM 1103 are connected to each other via a bus 1104. An input/output (I/O) interface 1105 is also connected to the bus 1104.

The following components in the device 1100 are connected to the I/O interface 1105: an input unit 1106, such as a keyboard, a mouse and the like; an output unit 1107, such as various kinds of displays, a loudspeaker, etc.; a storage unit 1108, such as a magnetic disk, an optical disk, etc.; a communication unit 1109, such as a network card, a modem, a wireless communication transceiver, etc. The communication unit 1109 allows the device 1100 to exchange information/data with other devices through a computer network such as the Internet and/or various kinds of telecommunications networks.

Various methods or processes described above can be executed by the CPU 1101. For example, in some embodiments, the methods can be implemented as a computer software program that is tangibly embodied on a machine readable medium, e.g., the storage unit 1108. In some embodiments, part or all of the computer programs can be loaded and/or mounted onto the device 1100 via ROM 1102 and/or communication unit 1109. When the computer program is loaded to the RAM 1103 and executed by the CPU 1101, one or more steps of the methods or processes as described above can be executed.

In some embodiments, the methods and processes as described above may be implemented as a computer program product. The computer program product may include a computer readable storage medium on which computer readable program instructions are carried out for performing each aspect of the present disclosure.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams illustrate the architecture, functionality, and operation of possible implementations of systems, methods and computer program products according to various embodiments of the present disclosure. In this regard, each block in the flowcharts or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, so as to enable those of ordinary skill in the art to understand the embodiments disclosed herein.

What is claimed is:

1. A method of processing a task, comprising:
receiving, at a network device from a set of computing devices, a set of initialization requests, the network device being separate from the set of computing devices, operatively coupled to each of the computing devices, and configured for broadcasting of network data packets to the set of computing devices;
in response to receiving the set of initialization requests from the set of computing devices at the network device, initializing, at the network device, a first flag set associated with the set of computing devices to indicate that no processing results have been received from the set of computing devices;
receiving, at the network device from the set of computing devices, a set of processing results derived from processing the task by the set of computing devices, the set of computing devices processing at least portions of the task in parallel with one another;
updating, at the network device in conjunction with the receiving of the set of processing results, the first flag set to indicate whether or not the set of processing results has been received from the set of computing devices at the network device;
in response to the set of processing results having been received from the set of computing devices at the network device, as determined based at least in part on the first flag set, executing a reduction operation on the set of processing results in the network device;
maintaining, at the network device in conjunction with the executing, a second flag set indicating whether or not the reduction operation has been completed on the set of processing results in the network device; and transmitting a result of the reduction operation, as determined based at least in part on the second flag set, from the network device to the set of computing devices via a network data packet broadcasting mechanism of the network device.

2. The method of claim 1, wherein the network device comprises at least one of a programmable switch and a router.

3. The method of claim 1, wherein the set of computing devices comprises a first computing device, the set of processing results comprises a first processing result transmitted from the first computing device, and wherein the method further comprises:
after transmitting the result of the reduction operation to the set of computing devices,
in response to receiving the first processing result from the first computing device again, retransmitting the result of the reduction operation to the set of computing devices.

4. The method of claim 1, further comprising:
before receiving the set of processing results,
receiving, from the set of computing devices, a set of requests for executing the reduction operation; and
in response to receiving the set of requests, transmitting, to each of the set of computing devices, a response to the set of requests.

5. The method of claim 4, wherein receiving the set of processing results comprises:
determining, based on the received set of requests, respective network information of the set of computing devices; and
receiving, based on the respective network information of the set of computing devices, the set of processing results from the set of computing devices.

6. The method of claim 4, wherein the set of computing devices comprises a second computing device, the set of requests comprises a second request transmitted from the second computing device, and wherein the method further comprises:
after transmitting the response to each of the set of computing devices,
in response to receiving the second request from the second computing device again, retransmitting the response to the second computing device.

7. The method of claim 1 further comprising:
deriving, at a first computing device in the set of computing devices, a processing result from processing the task;
transmitting, to the network device from the first computing device, the processing result to enable the network device to execute a reduction operation on the set of processing results; and
receiving, at the first computing device from the network device, via the network data packet broadcasting mechanism of the network device, a result of the reduction operation.

8. The method of claim 7, wherein the network device comprises at least one of a programmable switch and a router.

9. The method of claim 7, wherein transmitting the processing result to the network device comprises:
pre-processing the processing result such that the pre-processed processing result is adapted for the reduction operation to be executed by the network device; and
transmitting, to the network device, the pre-processed processing result.

10. The method of claim 9, wherein pre-processing the processing result comprises at least one of the following:
converting the processing result into a predetermined value range;
converting the processing result from a negative value into a positive value; and
converting the processing result from a floating point number into an integer.

11. The method of claim 9, further comprising:
in response to receiving the result of the reduction operation, performing post-processing opposite to the pre-processing on the result of the reduction operation.

12. The method of claim 7, further comprising:
in response to failing to receive the result of the reduction operation within a first threshold period after transmitting the processing result, retransmitting the processing result to the network device.

13. The method of claim 7, wherein transmitting the processing result to the network device comprises:
before transmitting the processing result, transmitting a request for executing the reduction operation to the network device; and
in response to receiving a response to the request from the network device, transmitting the processing result to the network device.

14. The method of claim 13, further comprising:
in response to failing to receive the response to the request within a second threshold period after transmitting the request, retransmitting the request to the network device.

15. A network device, comprising:
a processor; and
a memory storing computer program instructions, the processor executing the computer program instructions stored in the memory to cause the network device to perform acts comprising:
receiving, at a network device from a set of computing devices, a set of initialization requests, the network device being separate from the set of computing devices, operatively coupled to each of the computing devices, and configured for broadcasting of network data packets to the set of computing devices;
in response to receiving the set of initialization requests from the set of computing devices at the network device, initializing, at the network device, a first flag set associated with the set of computing devices to indicate that no processing results have been received from the set of computing devices;
receiving, at the network device from the set of computing devices, a set of processing results derived from processing the task by the set of computing devices, the set of computing devices processing at least portions of the task in parallel with one another;
updating, at the network device in conjunction with the receiving of the set of processing results, the first flag set to indicate whether or not the set of processing results has been received from the set of computing devices at the network device;
in response to the set of processing results having been received from the set of computing devices at the network device, as determined based at least in part on the first flag set, executing a reduction operation on the set of processing results in the network device;
maintaining, at the network device in conjunction with the executing, a second flag set indicating whether or not the reduction operation has been completed on the set of processing results in the network device; and transmitting a result of the reduction operation, as determined based at least in part on the second flag set, from the network device to the set of computing devices via a network data packet broadcasting mechanism of the network device.

16. The network device of claim 15, wherein the network device comprises at least one of a programmable switch and a router.

17. The network device of claim 15, wherein the set of computing devices comprises a first computing device, the set of processing results comprises a first processing result transmitted from the first computing device, and wherein the acts further comprise:

after transmitting the result of the reduction operation to the set of computing devices,
in response to receiving the first processing result from the first computing device again, retransmitting the result of the reduction operation to the set of computing devices.

18. A computer program product tangibly stored on a non-transient computer storage medium and comprising machine-executable instructions, the machine-executable instructions, when executed by at least one device, causing the at least one device to perform a method of processing a task, the method comprising:

receiving, at a network device from a set of computing devices, a set of initialization requests, the network device being separate from the set of computing devices, operatively coupled to each of the computing devices, and configured for broadcasting of network data packets to the set of computing devices;

in response to receiving the set of initialization requests from the set of computing devices at the network device, initializing, at the network device, a first flag set associated with the set of computing devices to indicate that no processing results have been received from the set of computing devices;

receiving, at the network device from the set of computing devices, a set of processing results derived from processing the task by the set of computing devices, the set of computing devices processing at least portions of the task in parallel with one another;

updating, at the network device in conjunction with the receiving of the set of processing results, the first flag set to indicate whether or not the set of processing results has been received from the set of computing devices at the network device;

in response to the set of processing results having been received from the set of computing devices at the network device, as determined based at least in part on the first flag set, executing a reduction operation on the set of processing results in the network device;

maintaining, at the network device in conjunction with the executing, a second flag set indicating whether or not the reduction operation has been completed on the set of processing results in the network device; and transmitting a result of the reduction operation, as determined based at least in part on the second flag set, from the network device to the set of computing devices via a network data packet broadcasting mechanism of the network device.

19. The computer program product of claim 18, wherein the method further comprises:

deriving, at a first computing device in the set of computing devices, a processing result from processing the task;

transmitting, to the network device from the first computing device, the processing result to enable the network device to execute a reduction operation on the set of processing results; and receiving, at the first computing device from the network device, via the network data packet broadcasting mechanism of the network device, a result of the reduction operation.

20. The computer program product of claim 18, wherein the method further comprises:

before receiving the set of processing results,
receiving, from the set of computing devices, a set of requests for executing the reduction operation; and
in response to receiving the set of requests, transmitting, to each of the set of computing devices, a response to the set of requests.

* * * * *